United States Patent
Fan

(10) Patent No.: US 12,377,568 B2
(45) Date of Patent: Aug. 5, 2025

(54) CUTTER HOLDER FOR MICROTOME

(71) Applicant: Leica Biosystems Nussloch GmbH, Nussloch (DE)

(72) Inventor: ZheGuang Fan, Shanghai (CN)

(73) Assignee: Leica Biosystems Nussloch GmbH, Nussloch (DE)

( * ) Notice: Subject to any disclaimer, the term of this patent is extended or adjusted under 35 U.S.C. 154(b) by 277 days.

(21) Appl. No.: 17/793,441

(22) PCT Filed: Jan. 19, 2021

(86) PCT No.: PCT/CN2021/072637
§ 371 (c)(1),
(2) Date: Jul. 18, 2022

(87) PCT Pub. No.: WO2021/147842
PCT Pub. Date: Jul. 29, 2021

(65) Prior Publication Data
US 2023/0076711 A1    Mar. 9, 2023

(30) Foreign Application Priority Data
Jan. 20, 2020 (CN) .......................... 202020129985.9

(51) Int. Cl.
*B26D 7/26* (2006.01)
*G01N 1/06* (2006.01)

(52) U.S. Cl.
CPC ............. *B26D 7/2614* (2013.01); *G01N 1/06* (2013.01); *G01N 2001/061* (2013.01)

(58) Field of Classification Search
CPC ................ G01N 1/06; G01N 2001/061; Y10S 83/9155; Y10S 83/954; Y10T 407/225; B23B 29/06

(Continued)

(56) References Cited

U.S. PATENT DOCUMENTS 3,599,523 A    8/1971  Pickett
5,516,241 A *  5/1996  Plutschuck ............. B23B 27/04
                                              407/110

(Continued)

FOREIGN PATENT DOCUMENTS

CN    201497652 U    6/2010
CN    203432814 U    2/2014

(Continued)

OTHER PUBLICATIONS

Chinese Office Action for Chinese Patent Application No. 202180009977.8, dated Jan. 21, 2024, 13 pages.

(Continued)

*Primary Examiner* — Jennifer S Matthews
(74) *Attorney, Agent, or Firm* — Kinney & Lange, P.A.

(57) ABSTRACT

The present disclosure relates to a cutter holder for a microtome. The cutter holder includes: a base; a pressing plate pivotably mounted to the base and having a first end configured to clamp the cutter; an eccentric shaft rotatably mounted in the base; and a sliding assembly slidably mounted in the base. The sliding assembly is arranged between the pressing plate and the eccentric shaft and is in contact with the eccentric shaft, and the sliding assembly is movable towards the pressing plate when the eccentric shaft rotates, so as to force the first end of the pressing plate to clamp the cutter with the base. The cutter holder according to embodiments of the present disclosure allows easy mounting and replacement of the pressing plate, facilitates clamping of the cutter and regulation of a clamping force, and has high working efficiency and high reliability.

8 Claims, 3 Drawing Sheets

(58) Field of Classification Search
USPC .............................................. 407/91, 93, 94
See application file for complete search history.

(56) References Cited

U.S. PATENT DOCUMENTS

| | | | |
|---|---|---|---|
| 6,241,429 B1 * | 6/2001 | Schafer | .................. B23B 27/04 407/117 |
| 2014/0033888 A1 * | 2/2014 | Walter | ..................... G01N 1/06 83/698.11 |

FOREIGN PATENT DOCUMENTS

| | | | | | |
|---|---|---|---|---|---|
| CN | 105865833 | A | * | 8/2016 | |
| CN | 109291128 | A | | 2/2019 | |
| CN | 109291128 | B | * | 10/2020 | ........... B26D 7/2614 |
| DE | 19512274 | A1 | * | 10/1996 | ............... G01N 1/06 |
| EP | 0158484 | A2 | * | 10/1985 | |
| GB | 2148528 | A | * | 5/1985 | ............... G01N 1/06 |
| GB | 2238973 | A | * | 6/1991 | ............... G01N 1/06 |
| JP | 2001289747 | A | | 10/2001 | |
| JP | 2016161565 | A | | 9/2016 | |
| WO | 2021081793 | A1 | | 5/2021 | |
| WO | 2021081861 | A1 | | 5/2021 | |

OTHER PUBLICATIONS

Extended European Search Report for European Patent Application No. 21744958.6, dated Dec. 4, 2023, 16 pages.
Japanese Office Action for Japanese Patent Application No. 2022-539414, dated Aug. 7, 2024, 8 pages.

* cited by examiner

CUTTER HOLDER FOR MICROTOME

CROSS-REFERENCE TO RELATED APPLICATIONS

The present application is a national phase entry under 35 USC § 371 of International Application PCT/CN2021/072637, filed Jan. 19, 2021, which claims the benefit of and priority to Chinese Patent Application Serial No. 202020129985.9, filed with National Intellectual Property Administration of PRC on Jan. 20, 2020, the entire content of which is incorporated herein by reference.

FIELD

The present disclosure relates to a technical field of microtomes, and more particularly to a cutter holder for a microtome.

BACKGROUND

In a related art, a cutter holder usually includes a base and a pressing plate, and the pressing plate is mounted on the base to clamp the cutter to the base and is pivotable relative to the base to release the cutter.

GB2182881B discloses a cutter holder for a microtome. A clamping plate is mounted on a carrier plate by an adjusting screw and is tiltable about the adjusting screw, and a gap between the clamping plate and the carrier plate may be changed by means of the adjusting screw to adapt to thickness differences of different cutters. A spring rests on a clamping shaft and is settable by means of set screws for the regulation of the clamping force. The known cutter holder has a plurality of screws. When the clamping plate is mounted and the clamping force is regulated, the plurality of screws need to be operated, which takes a relatively long time, and is not convenient for the replacement of the clamping plate when it is damaged.

SUMMARY

The present disclosure aims to solve at least one of the technical problems in the related art to a certain extent.

To this end, one objective of the present disclosure is to propose a cutter holder for a microtome which allows easy mounting and replacement of a pressing plate, facilitates clamping of a cutter and regulation of a clamping force, and has high working efficiency and high reliability.

According to embodiments of the present disclosure, a cutter holder for a microtome is proposed. The cutter holder includes: a base; a pressing plate pivotably mounted to the base and having a first end configured to clamp a cutter; an eccentric shaft rotatably mounted in the base; and a sliding assembly slidably mounted in the base. The sliding assembly is arranged between the pressing plate and the eccentric shaft and in contact with the eccentric shaft, and the sliding assembly is movable towards the pressing plate when the eccentric shaft rotates, so as to force the first end of the pressing plate to clamp the cutter with the base.

The cutter holder according to the embodiments of the present disclosure omits screws by pivotably mounting the pressing plate to the base, such that the pressing plate is easy to be mounted and replaced. The sliding assembly and the eccentric shaft are arranged in the base, such that the cutter may be clamped and the clamping force to the cutter may be regulated by operating the eccentric shaft to rotate, without the adjustment of a plurality of screws, thereby improving working efficiency.

Furthermore, the cutter holder according to the embodiments of the present disclosure may have the additional technical features as follows:

According to at least one embodiment of the present disclosure, the cutter holder further includes a pivot shaft mounted to the base. The pressing plate defines a through hole fitted with the pivot shaft such that the pressing plate is pivotable around the pivot shaft. Thus, the pressing plate may be pivotally mounted to the base without the use of screws.

According to at least one embodiment of the present disclosure, a cross-sectional profile of the through hole includes an arc segment and a straight-line segment, a diameter of the arc segment is greater than a diameter of the pivot shaft, and a maximum distance between a point on the arc segment and the straight-line segment is equal to or greater than the diameter of the pivot shaft and less than the diameter of the arc segment. Thus, the pressing plate is flexibly pivotable around the pivot shaft, and a radial displacement of the pressing plate relative to the pivot shaft may be limited.

According to at least one embodiment of the present disclosure, the pressing plate is provided with a boss, the boss protrudes towards the base from a surface of the pressing plate facing the base, the through hole is defined in the boss; the base defines a first receiving groove opening towards the pressing plate and a first shaft hole in communication with the first receiving groove, the boss is accommodated in the first receiving groove, and the pivot shaft is inserted into the first shaft hole and passes through the through hole in the boss. Thus, the pressing plate may be stably mounted to the base.

According to at least one embodiment of the present disclosure, a plurality of bosses are provided, the plurality of bosses are linearly aligned and evenly spaced apart; a plurality of first receiving grooves are provided, the plurality of bosses are respectively fitted in the plurality of first receiving grooves; the first shaft hole is in communication with the plurality of first receiving grooves, and the pivot shaft is inserted into the first shaft hole and sequentially passes through the through holes in the plurality of bosses. Thus, the pressing plate may be more stably mounted to the base, thereby improving the reliability of the cutter holder.

According to at least one embodiment of the present disclosure, the base defines a second receiving groove opening towards the pressing plate and a second shaft hole in communication with the second receiving groove, the sliding assembly is accommodated in the second receiving groove, the eccentric shaft is inserted into the second shaft hole and reaches into the second receiving groove, a first end of the sliding assembly is in contact with a peripheral face of the eccentric shaft, and a second end of the sliding assembly extends towards the pressing plate and is adjacent to the pressing plate. Thus, the pressing plate may clamp the cutter to the base or release the cutter from the base, and the clamping force of the pressing plate to the cutter can be regulated.

According to at least one embodiment of the present disclosure, a diameter of the second shaft hole is greater than a diameter of the eccentric shaft, so as to avoid the second shaft hole from interfering with an eccentric rotation of the eccentric shaft in the second shaft hole.

According to at least one embodiment of the present disclosure, the sliding assembly includes a screw and an abutting block, a first end of the screw is in contact with a peripheral face of the eccentric shaft, a second end of the screw extends towards the pressing plate and is adjacent to the pressing plate, and the abutting block is fixed at the second end of the screw and is configured to be in contact with the pressing plate. Thus, the eccentric shaft may drive the pressing plate to clamp the cutter through the screw and the abutting block.

According to at least one embodiment of the present disclosure, the sliding assembly further includes a sliding sleeve having an internal thread, the screw is threadedly connected in the sliding sleeve, and the sliding sleeve is arranged in the second receiving groove and is in contact with an inner wall face of the second receiving groove. Thus, the sliding assembly may be slidably mounted in the base.

According to at least one embodiment of the present disclosure, the boss is arranged to be offset from a center of the pressing plate and adjacent to the first end of the pressing plate. Thus, the mass of a first end side of the pressing plate is less than that of a second end side relative to the boss, and the pressing plate tends to pivot towards a direction of releasing the cutter under the action of gravity.

Additional aspects and advantages of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and readily appreciated from the following descriptions made with reference to the drawings.

DETAILED DESCRIPTION

The preferred embodiments of the present disclosure are described below with reference to the accompanying drawings. It should be noted that terms "up", "down", "left", "right", "front", "rear" and similar expressions used herein are only for the purpose of explanation, and cannot be construed as the limitation of the present disclosure.

A cutter holder 100 for a microtome according to specific embodiments of the present disclosure will be described below according to the drawings.

Figure 1:
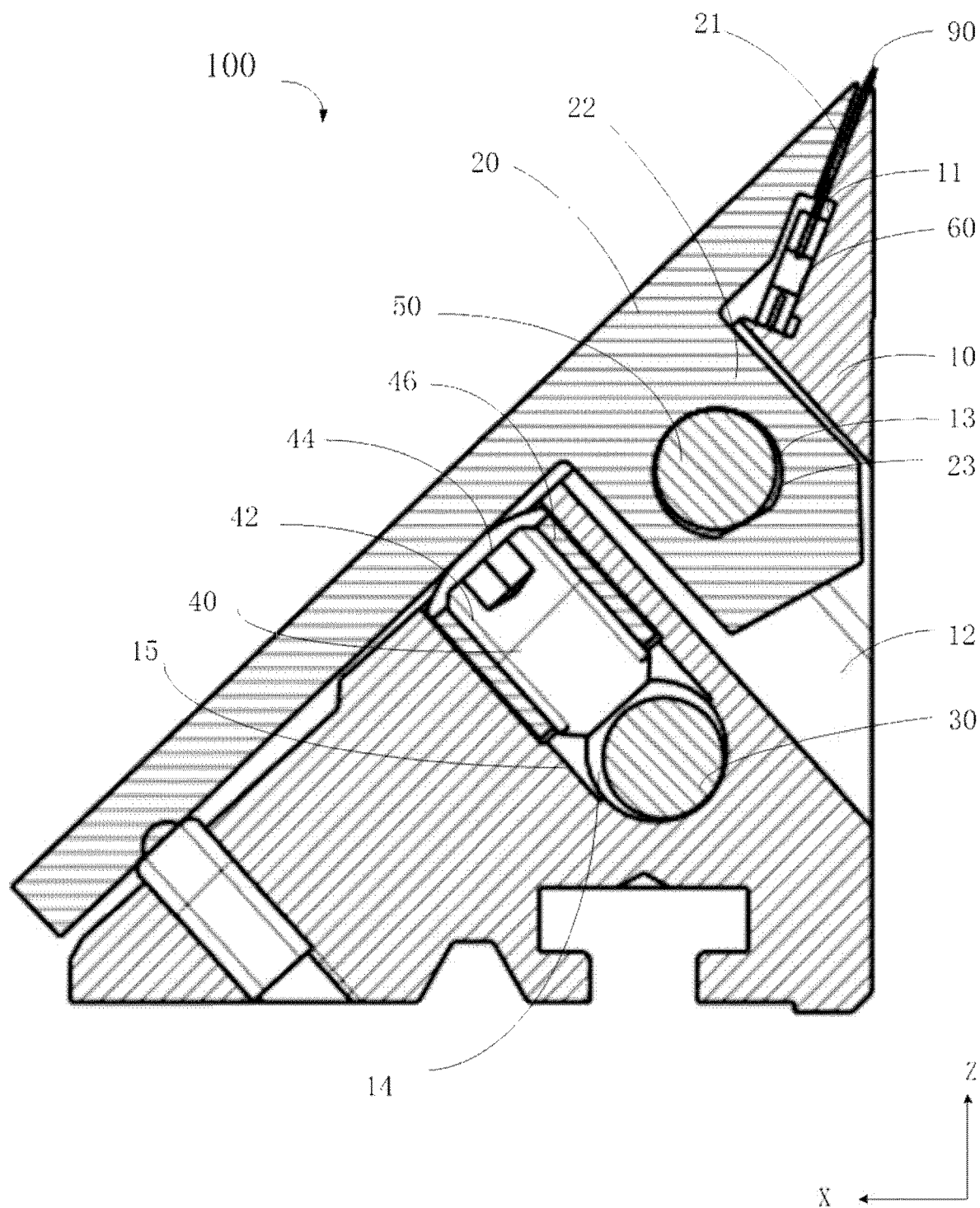
FIG. 1 is a cross-sectional view of a cutter holder for a microtome according to an embodiment of the present disclosure.
Figure 2:
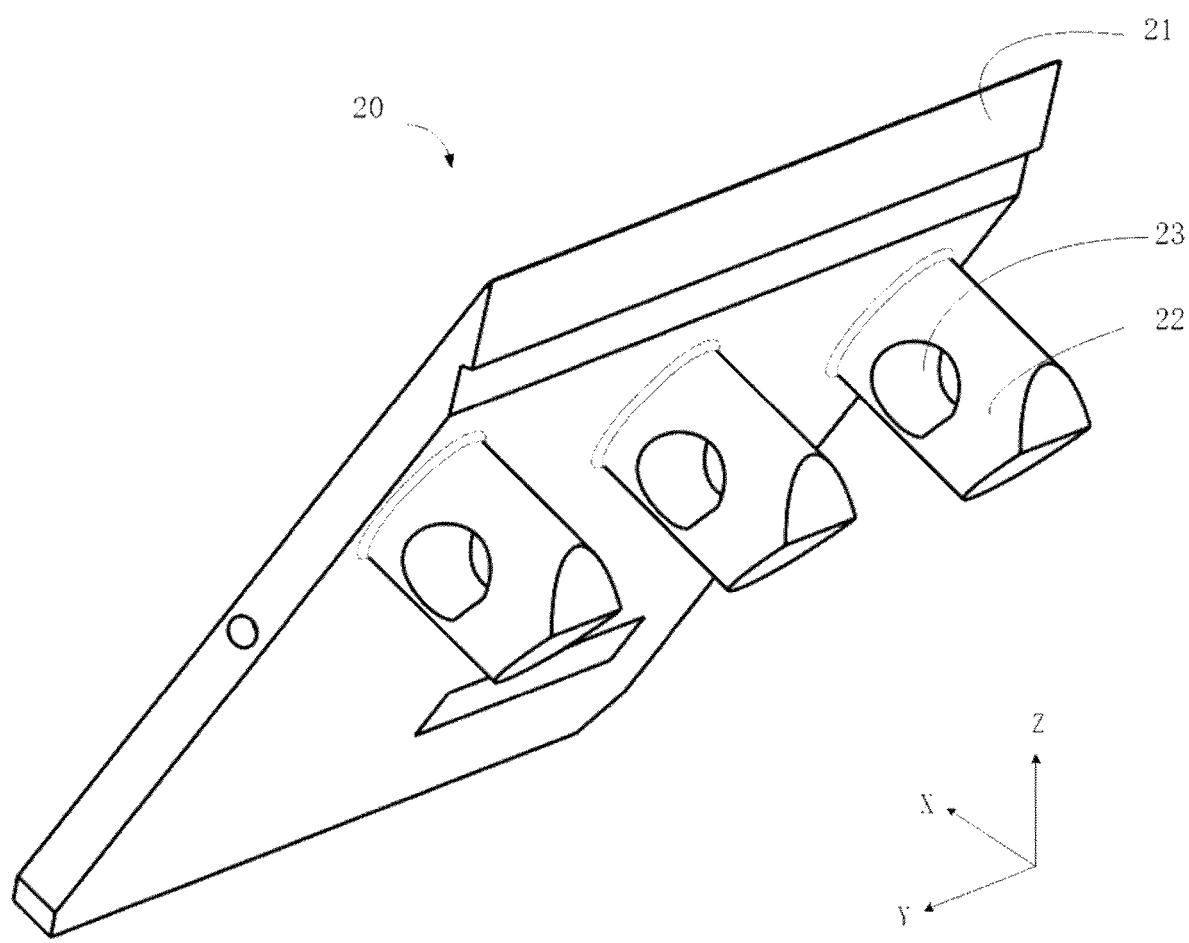
FIG. 2 is a perspective view of a pressing plate according to an embodiment of the present disclosure.
Figure 3:
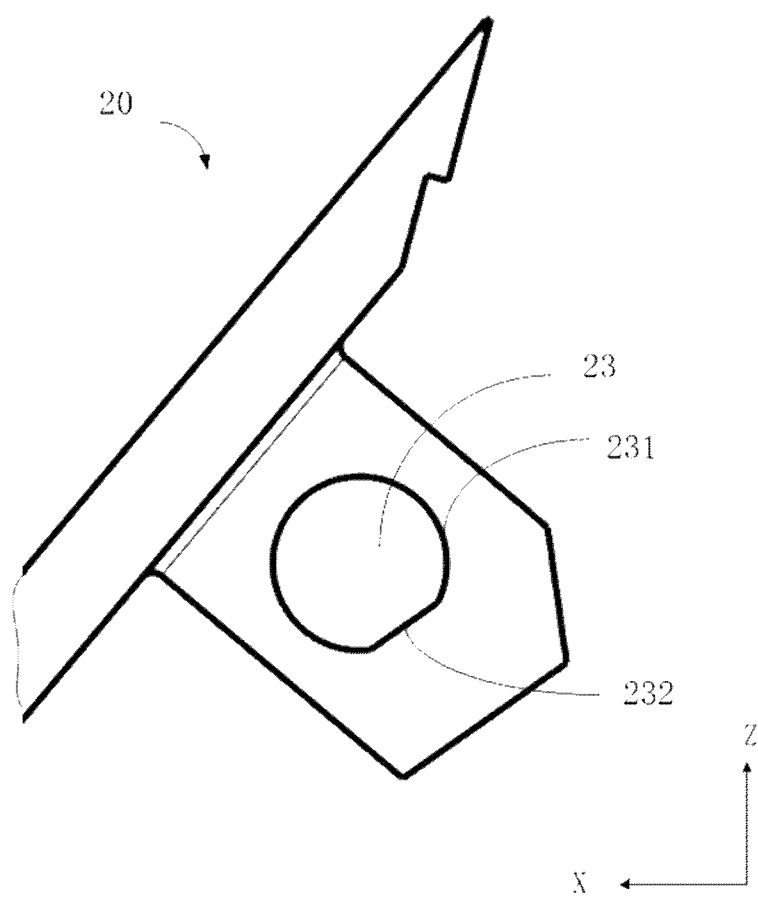
FIG. 3 is a partial side view of a pressing plate according to an embodiment of the present disclosure.

In FIGS. 1 to 3, in order to facilitate the description and the orientation, orthogonal XYZ axes are illustrated. A positive direction of X axis is a front direction, while a negative direction of X axis is a rear direction; a positive direction of Y axis is a right direction, while a negative direction of Y axis is a left direction; a positive direction of Z axis is an up direction, while a negative direction of X axis is a down direction.

According to an embodiment of the present disclosure, the cutter holder 100 for the microtome is proposed. As illustrated in FIG. 1, the cutter holder 100 includes: a base 10; a pressing plate 20 pivotably mounted to the base 10 and having a first end for clamping a cutter 90; an eccentric shaft 30 rotatably mounted in the base 10; and a sliding assembly 40 slidably mounted in the base 10. The sliding assembly 40 is arranged between the pressing plate 20 and the eccentric shaft 30 and is in contact with the eccentric shaft 30, and the sliding assembly 40 is movable towards the pressing plate 20 when the eccentric shaft 30 rotates so as to force the first end of the pressing plate 20 to clamp the cutter 90 with the base 10.

The cutter holder 100 according to the embodiment of the present disclosure omits screws by pivotably mounting the pressing plate 20 to the base 10, such that the pressing plate 20 is easy to be mounted and replaced. The sliding assembly 40 and the eccentric shaft 30 are arranged in the base 10, such that the cutter 90 may be clamped and the clamping force to the cutter 90 may be regulated by operating the eccentric shaft 30 to rotate, without the adjustment of a plurality of screws, thereby improving working efficiency.

In some embodiments, as illustrated in FIG. 1, the cutter holder 100 also includes a pivot shaft 50 mounted to the base 10. The pressing plate 20 defines a through hole 23 fitted with the pivot shaft 50, such that the pressing plate 20 is pivotable around the pivot shaft 50. Thus, the pressing plate 20 may be pivotally mounted to the base 10 without the use of screws.

In some embodiments, as illustrated in FIG. 3, a cross-sectional profile of the through hole 23 includes an arc segment 231 and a straight-line segment 232, a diameter of the arc segment 231 is greater than a diameter of the pivot shaft 50, and a maximum distance between a point on the arc segment 231 and the straight-line segment 232 is equal to or greater than the diameter of the pivot shaft 50 and less than the diameter of the arc segment 231. Thus, the pressing plate 20 is flexibly pivotable around the pivot shaft 50, and a radial displacement of the pressing plate 20 relative to the pivot shaft 50 may be limited.

In some embodiments, as illustrated in FIG. 1, the pressing plate 20 is provided with a boss 22, the boss 22 protrudes towards the base 10 from a surface of the pressing plate 20 that faces the base 10, and the through hole 23 is defined in the boss 22. The base 10 defines a first receiving groove 12 opening towards the pressing plate 20 and a first shaft hole 13 in communication with the first receiving groove 12, the boss 22 is accommodated in the first receiving groove 12, and the pivot shaft 50 is inserted into the first shaft hole 13 and passes through the through hole 23 in the boss 22. Thus, the pressing plate 20 may be stably mounted to the base 10. In some examples, an axis of the boss 22 is substantially perpendicular to the surface of the pressing plate 20 facing the base 10; and an axis of the first shaft hole 13 is perpendicular to an axis of the first receiving groove 12.

In some embodiments, as illustrated in FIG. 2, a plurality of bosses 22 are provided, and the plurality of bosses 22 are linearly aligned and evenly spaced apart. A plurality of first receiving grooves 12 are provided, and the plurality of bosses 22 are respectively fitted in the plurality of first receiving grooves 12. The first shaft hole 13 is in communication with the plurality of first receiving grooves 12, and the pivot shaft 50 is inserted into the first shaft hole 13 and sequentially passes through the through holes in the plurality of bosses 22. Thus, the pressing plate 20 may be more stably mounted to the base 10, thereby improving the reliability of the cutter holder 100.

In some embodiments, as illustrated in FIG. 1, the base 10 defines a second receiving groove 15 opening towards the pressing plate 20 and a second shaft hole 14 in communication with the second receiving groove 15, the sliding assembly 40 is accommodated in the second receiving groove 15, and the eccentric shaft 30 is inserted into the second shaft hole 14 and reaches into the second receiving groove 15. A first end of the sliding assembly 40 is in contact with a peripheral face of the eccentric shaft 30, and a second end of the sliding assembly 40 extends towards the pressing plate 20 and is adjacent to the pressing plate 20. Thus, the pressing plate 20 may clamp the cutter 90 to the base 10 or release the cutter 90 from the base 10, and the clamping force of the pressing plate 20 to the cutter 90 may be regulated. In some examples, an axis of the second shaft hole 14 is perpendicular to an axis of the second receiving groove 15.

In some embodiments, as illustrated in FIG. 1, a diameter of the second shaft hole 14 is greater than a diameter of the eccentric shaft 30, so as to avoid the second shaft hole 14 from interfering with an eccentric rotation of the eccentric shaft 30 in the second shaft hole 14.

In some embodiments, as illustrated in FIG. 1, the sliding assembly 40 includes a screw 42 and an abutting block 44, a first end of the screw 42 is in contact with a peripheral face of the eccentric shaft 30, a second end of the screw 42 extends towards the pressing plate 20 and is adjacent to the pressing plate 20, and the abutting block 44 is fixed at the second end of the screw 42 and is configured to be in contact with the pressing plate 20. Thus, the eccentric shaft 30 may drive the pressing plate 20 to clamp the cutter 90 through the screw 42 and the abutting block 44. In some examples, the abutting block 44 is made of an elastic material such as rubber, plastic, etc. to reduce the wear on the pressing plate 20.

In some embodiments, as illustrated in FIG. 1, the sliding assembly 40 also includes a sliding sleeve 46 having an internal thread, the screw 42 is threadedly connected in the sliding sleeve 46, and the sliding sleeve 46 is arranged in the second receiving groove 15 and is in contact with an inner wall face of the second receiving groove 15. Thus, the sliding assembly 40 may be slidably mounted in the base 10.

In some embodiments, as illustrated in FIGS. 1 and 2, the boss 22 is arranged to be offset from a center of the pressing plate 20 and close to the first end of the pressing plate 20. Thus, the mass of a first end side of the pressing plate 20 is less than that of a second end side relative to the boss 22, and the pressing plate 20 tends to pivot towards a direction of releasing the cutter 90 under the action of gravity.

A cutter holder 100 for a microtome according to a specific embodiment of the present disclosure will be described below according to the drawings.

Referring to FIGS. 1 to 3, the cutter holder 100 according to the specific embodiment of the present disclosure includes a base 10, a pressing plate 20, an eccentric shaft 30, a sliding assembly 40, a pivot shaft 50, and a support member 60.

As illustrated in FIG. 1, the base 10 has a substantially wedged shape, and the base 10 defines a cutter groove 11 in an upper end of its inclined face to receive the cutter 90.

As illustrated in FIG. 1 and FIG. 2, the pressing plate 20 has a substantially platelike shape, the pressing plate 20 may be pivotally mounted to the base 10 from an inclined face side of the base 10 (a front side in FIG. 1), the pressing plate 20 forms an abutting face 21 at its upper end, and the abutting face 21 is configured to be in contact with the cutter 90, so as to clamp the cutter 90 in the cutter groove 11 of the base 10.

The pressing plate 20 is provided with three cylindrical bosses 22, each boss 22 extends towards the base 10 from a surface of the pressing plate 20 facing the base 10, an axis of each boss 22 is substantially perpendicular to the surface of the pressing plate 20 facing the base 10, and the three bosses 22 are linearly aligned and evenly spaced along a left-and-right direction. Accordingly, the base 10 defines three first receiving grooves 12 extending through its inclined face, and the three bosses 22 of the pressing plate 20 are respectively accommodated in the three first receiving grooves 12 of the base 10.

The pressing plate 20 also defines one through hole 23 in each boss 22, and the base 10 is also provided with a first shaft hole 13 in communication with the three first receiving grooves 12. The pivot shaft 50 is inserted into the first shaft hole 13 and sequentially passes through the through holes 23 of the three bosses 22 accommodated in the three first receiving grooves 12 of the base 10. In this way, a pivotable connection between the pressing plate 20 and the base 10 may be realized.

The base 10 is provided with a second shaft hole 14 substantially parallel to the first shaft hole 13. The eccentric shaft 30 is mounted in the second shaft hole 14 and is rotatable relative to the base 10. A diameter of the second shaft hole 14 is greater than that of the eccentric shaft 30, so as to avoid from interfering with the eccentric rotation of the eccentric shaft 30 in the second shaft hole 14.

The base 10 is also provided with a second receiving groove 15, and an axis of the second receiving groove 15 is substantially perpendicular to an axis of the second shaft hole 14. The sliding assembly 40 may be slidably accommodated in the second receiving groove 15, and the second receiving groove 15 is in communication with the second shaft hole 14 and is opened toward the pressing plate 20. The second receiving groove 15 is located at a side of the first receiving groove 12 away from the cutter 90, such that the pivot shaft 50 is located between the cutter 90 and the sliding assembly 40. Thus, the sliding assembly 40 is movable towards the pressing plate 20 when the eccentric shaft 30 rotates, so as to force the pressing plate 20 to pivot towards a direction of clamping the cutter 90 relative to the base 10, or move away from the pressing plate 20 to release the pressing plate 20.

The sliding assembly 40 includes a screw 42, an abutting block 44, and a sliding sleeve 46. A lower end of the screw 42 is in contact with a peripheral face of the eccentric shaft 30 accommodated in the second shaft hole 14, and an upper end of the screw 42 is provided with the abutting block 44 in contact with the pressing plate 20. The abutting block 44 may be made of an elastic material such as rubber, plastic, etc. to reduce the wear to the pressing plate 20. The sliding sleeve 46 has an internal thread, the screw 42 is threadedly connected in the sliding sleeve 46, the sliding sleeve 46 is arranged in the second receiving groove 15 and in contact with an inner wall face of the second receiving groove 15, such that the sliding assembly 40 may slide along the second receiving groove 15. Therefore, when the eccentric shaft 30 rotates, the sliding assembly 40 is movable towards the pressing plate 20, and an upper end of the sliding assembly 40 pushes the pressing plate 20 to pivot relative to the base 10 towards a direction of clamping the cutter 90, so as to clamp the cutter 90.

The three bosses 22 are arranged away from a center of the pressing plate 20 and close to the upper end of the pressing plate 20. Therefore, a mass of an upper end side of the pressing plate 20 is less than that of a lower end side relative to the boss 22. The pressing plate 20 tends to pivot towards a direction of releasing the cutter 90 under the action of gravity. In this way, when the eccentric shaft 30 is operated to move the sliding assembly 40 away from the pressing plate 20, the pressing plate 20 is always in contact with the abutting block 44 of the sliding assembly 40 under the action of gravity, so as to release the cutter 90.

As illustrated in FIG. 3, a cross-sectional profile of each through hole 23 includes an arc segment 231 and a straight-line segment 232. A diameter of the arc segment 231 is greater than a diameter of the pivot shaft 50, and a maximum distance between a point on the arc segment 231 and the straight-line segment 232 is equal to or greater than the diameter of the pivot shaft 50 and less than the diameter of the arc segment 231. Therefore, the pressing plate 20 is flexibly pivotable around the pivot shaft 50, and at the same time a radial displacement of the pressing plate 20 relative to the pivot shaft 50 may be limited. When the sliding assembly 40 pushes the pressing plate 20 to pivot towards a direction of clamping the cutter 90 relative to the base 10, it is avoided that the radial displacement of the pressing plate 20 relative to the pivot shaft 50 affects the position of the cutter 90 and then causes the cutter 90 to be unstable.

As illustrated in FIG. 1, the support member 60 is supported at a bottom of the cutter groove 11 and the cutter 90 is supported on the support member 60. By using the support member 60, the cutter holder 100 may be configured to clamp the cutter 90 with different depths, thus improving the versatility of the cutter holder 100.

As illustrated in FIG. 1, when the eccentric shaft 30 is at a farthest position from the pressing plate 20, the pressing plate 20 is in contact with the base 10 at its lower end, and a first gap is defined between the abutting face 11 at the upper end of the pressing plate 20 and a side wall face of the cutter groove 11 of the base 10, such that the cutter 90 is convenient to be inserted into the cutter groove 11 and be supported on the support 60. It may be understood that when the eccentric shaft 30 is at a nearest position from the pressing plate 20, the pressing plate 20 is away from the base 10 at its lower end, and the abutting face of the pressing plate 20 at its upper end further approaches to the side wall face of the cutter groove 11 of the base 10, and a second gap is defined therebetween. Moreover, the second gap is less than the first gap. Thus, the cutter holder 100 may be configured to clamp the cutter 90 whose thickness is within a range between the size of the second gap and the size of the first gap, so as to improve the versatility of the cutter 100.

The basic working process of the cutter holder 100 according to the specific embodiment of the present disclosure is described below with reference to the drawings.

Referring to FIG. 1, when the cutter 90 needs to be clamped, by operating the eccentric shaft 30 to rotate, the sliding assembly 40 is driven to move towards the pressing plate 20, such that the sliding assembly 40 pushes the pressing plate 20 to pivot around the pivot shaft 50, so as to clamp the cutter 90 in the cutter groove 11 of the base 10 through the abutting face 21. When the cutter 90 needs to be released, by operating the eccentric shaft 30 to rotate, the sliding assembly 40 is moved away from the pressing plate 20, and the pressing plate 20 pivots with the sliding assembly 40 towards a direction of releasing the cutter 90 under the gravity action, so as to release the cutter 90.

According to the cutter holder 100 according to the embodiments of the present disclosure, the pressing plate 20 may be pivotally mounted to the base 10 via the pivot shaft 50, and the screw is omitted, such that the pressing plate 20 is easy to be mounted and replaced; a plurality of bosses 22 and through holes 23 with the cross-sectional profile including the arc segment 231 and the straight-line segment 232 are provided on the pressing plate 20, such that the pressing plate 20 may be more stably mounted to the base 10 and the reliability of the cutter holder 100 is improved. By arranging the sliding assembly 40 and the eccentric shaft 30 in the base 10, the cutter 90 may be clamped and the clamping force to the cutter 90 may be regulated by operating the eccentric shaft 30 to rotate without adjusting a plurality of screws, so as to improve the working efficiency.

Other structures and principles of the cutter holder 100 according to the embodiments of the present disclosure may be understood by those skilled in the art, which will not be repeated herein.

In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, the phrase "a plurality of" means two or more than two, unless specified otherwise.

In the present disclosure, unless specified otherwise, terms "mounted", "coupled" "connected", "fixed" and the like are used broadly and encompass such as fixed connections, detachable connections, or integral connections; may also be mechanical or electrical connections or direct connections, or indirect connections via intervening structures; may also be inner communications or interactions of two elements, which can be understood by those skilled in the art according to specific situations.

In the descriptions of the present disclosure, it should be noted that, unless otherwise expressly specified and limited, the first feature "on" or "under" the second feature may be that the first and second features are in direct contact, or that the first and second features are in indirect contact through an intermediate medium. Moreover, the first feature "on", "above" and "on top of" the second feature may be that the first feature is directly above or obliquely above the second feature, or merely be that the first feature has a level higher than the second feature. The first feature "down", "below", "under" and "on bottom of" the second feature may be that the first feature is directly below or obliquely below the second feature, or merely be that the first feature has a level less than the second feature.

Reference throughout this specification to terms "an embodiment," "some embodiments," "an example", "a specific example," or "some examples," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Moreover, the particular features, structures, materials, or characteristics described may be combined in any suitable manner in one or more embodiments or examples. Furthermore, in the case of non-contradiction, those skilled in the art may combine and group the different embodiments or examples described in this specification and the features of the different embodiments or examples.

Although embodiments of the present disclosure have been illustrated and described above, it should be understood that the above embodiments are illustrative and cannot be construed to limit the present disclosure, and that those skilled in the art may change, modify, alternate and vary the above embodiments within the scope of the present disclosure.

What is claimed is:

1. A cutter holder for a microtome, comprising:
a base;
a pressing plate pivotably mounted to the base and having:
a first end configured to clamp a cutter;
an eccentric shaft rotatably mounted in the base;
a sliding assembly slidably mounted in the base; and
a pivot shaft mounted to the base, the pressing plate defining a through hole surrounding and fitted with the pivot shaft such that the pressing plate is pivotable around the pivot shaft;
wherein the sliding assembly is arranged between the pressing plate and the eccentric shaft and in contact with the eccentric shaft, and the sliding assembly is movable towards the pressing plate when the eccentric shaft rotates, so as to force the first end of the pressing plate to clamp the cutter with the base; and
wherein a cross-sectional profile of the through hole comprises an arc segment and a straight-line segment, a diameter of the arc segment is greater than a diameter of the pivot shaft, and a distance between any point on the arc segment and the straight-line segment is less than the diameter of the arc segment.

2. The cutter holder according to claim 1, wherein the pressing plate includes a boss, the boss protrudes towards the base from a surface of the pressing plate facing the base, and the through hole is defined in the boss; and wherein the base defines a first receiving groove opening towards the pressing plate and a first shaft hole in communication with the first receiving groove, the boss is accommodated in the first receiving groove, and the pivot shaft is inserted into the first shaft hole and passes through the through hole in the boss.

3. The cutter holder according to claim 2, wherein the pressing plate includes a plurality of bosses each having a through hole defined therein, the plurality of bosses are linearly aligned and evenly spaced apart; the base defines a plurality of first receiving grooves opening towards the pressing plate, the plurality of bosses are respectively fitted in the plurality of first receiving grooves; the first shaft hole is in communication with the plurality of first receiving grooves, and the pivot shaft is inserted into the first shaft hole and sequentially passes through the through holes in the plurality of bosses.

4. The cutter holder according to claim 2, wherein the boss is offset from a center of the pressing plate and close to the first end of the pressing plate.

5. The cutter holder according to claim 1, wherein the base defines a second receiving groove opening towards the pressing plate and a second shaft hole in communication with the second receiving groove, the sliding assembly is accommodated in the second receiving groove, the eccentric shaft is inserted into the second shaft hole and reaches into the second receiving groove, a first end of the sliding assembly is in contact with a peripheral face of the eccentric shaft, and a second end of the sliding assembly extends towards the pressing plate and is adjacent to the pressing plate.

6. The cutter holder according to claim 5, wherein a diameter of the second shaft hole is greater than a diameter of the eccentric shaft.

7. The cutter holder according to claim 5, wherein the sliding assembly comprises a screw and an abutting block, a first end of the screw is in contact with a peripheral face of the eccentric shaft, a second end of the screw extends towards the pressing plate and is adjacent to the pressing plate, and the abutting block is fixed at the second end of the screw and is configured to be in contact with the pressing plate.

8. The cutter holder according to claim 7, wherein the sliding assembly further comprises a sliding sleeve having an internal thread, the screw is threadedly connected in the sliding sleeve, and the sliding sleeve is arranged in the second receiving groove and is in contact with an inner wall face of the second receiving groove.

* * * * *